United States Patent [19]

Del Pesco

[11] 4,228,272
[45] Oct. 14, 1980

[54] METHOD OF CATALYTICALLY PREPARING TETRAHYDROFURAN/ALKYLENE OXIDE POLYMERIZATES USING A MONTMORILLONITE CLAY AS THE CATALYST

[75] Inventor: Thomas W. Del Pesco, Wilmington, Del.

[73] Assignee: E. I. Du Pont de Nemours and Company, Wilmington, Del.

[21] Appl. No.: 24,385

[22] Filed: Mar. 27, 1979

Related U.S. Application Data

[63] Continuation-in-part of Ser. No. 923,570, Jul. 11, 1978, abandoned.

[51] Int. Cl.$^2$ ............................................. C08G 65/20
[52] U.S. Cl. .................................. 528/413; 528/416; 568/613; 568/617
[58] Field of Search ................ 528/413, 416; 568/613, 568/617

[56] References Cited

U.S. PATENT DOCUMENTS

| | | | |
|---|---|---|---|
| 3,201,197 | 8/1965 | Showalter | 23/112 |
| 3,321,412 | 5/1967 | Naro | 260/2 |
| 3,328,467 | 6/1967 | Hamilton | 260/615 |
| 3,412,039 | 11/1968 | Miller | 252/428 |
| 3,997,563 | 12/1976 | Dale et al. | 260/338 |
| 4,127,513 | 11/1978 | Bellis | 528/413 |

FOREIGN PATENT DOCUMENTS

854958  11/1960  United Kingdom .

OTHER PUBLICATIONS

Süd–Chemie, A.G., Product Bulletin, "K–Catalysts", 17 pp., dated Jul., 1976, Süd–Chemie, A.G., Munich, Germany.

*Primary Examiner*—Earl A. Nielsen

[57] ABSTRACT

A polymerizate of THF and an alkylene oxide is prepared by catalytic polymerization, using as a catalyst an acid-activated montmorillonite clay having a pore volume of 0.4–0.8 cubic centimeter per gram, a surface area of 220–260 square meters per gram and an average pore diameter of 0.1–0.3 micron.

3 Claims, No Drawings

METHOD OF CATALYTICALLY PREPARING TETRAHYDROFURAN/ALKYLENE OXIDE POLYMERIZATES USING A MONTMORILLONITE CLAY AS THE CATALYST

CROSS-REFERENCE TO RELATED APPLICATION

This application is a continuation-in-part of application Serial No. 923,570, filed July 11, 1978, now abandoned.

DESCRIPTION

Technical Field

This invention relates to a process for preparing tetrahydrofuran (THF)/alkylene oxide polymerizates. It is more particularly directed to a process whereby THF and an alkylene oxide are catalytically copolymerized using as a catalyst an acid-activated montmorillonate clay having specific physical characteristics.

Background Art

Processes for catalytically preparing THF/alkylene oxide polymerizates using montmorillonite clays as catalysts are known. One such process is shown in U.S. Pat. No. 4,127,513 to Howard Edward Bellis. According to the Bellis process, THF and an alkylene oxide are catalytically polymerized using as the catalyst a montmorillonite clay which has been acid-activated so that it contains, per gram, 0.1–0.9 milliequivalent of hydrogen ion having $pK_a$ values of $-3$ to $-8$. While the Bellis process is quite satisfactory, it has been found that the process of the present invention can provide polymerization rates twice that of Bellis, with their accompanying economic benefits, and with less color formation in the product during the early stages of polymerization. In addition, the preferred embodiments of the process of the invention produce THF/alkylene oxide polymerizates containing low levels of oligomeric cyclic ether byproducts, which, when the polymerizations are used in preparing polyurethanes, can cause undesirable weight loss and dimensional changes when the polyurethanes are exposed to water or organic liquids at high temperatures.

DISCLOSURE OF THE INVENTION

The clay used as the catalyst in the process of the invention is an acid-activated montmorillonite having a pore volume of 0.4–0.8 cubic centimer per gram, a surface area of 220–260 square meters per gram and an average pore diameter of 0.1–0.3 micron. It should be understood that these figures are composites and represent characteristics attributable to both the montmorillonite fraction of the clay and to the $SiO_2$ (alpha-quartz) fraction. A clay having such characteristics is a naturally-occurring montmorillonite sold by S/UMl/u/ d-Chemie A. G. of Munich, Germany, as "KO". This clay is supplied in the acid-activated form and can by used directly.

Pore volume, surface area and average pore diameter are determined by procedures described in "Experimental Methods in Catalytic Research", edited by Robert B. Anderson, Academic Press, 1968. In particular, surface area is measured with a Perkin-Elmer 212C or 212D Sorptometer, using the fixed pressure flow principle, as described on pages 72–74; pore volume is measured by the mercury intrusion method described on pages 80 and 81; and average pore diameter is measured as described on page 68.

The THF used in the process of the invention can be any kind ordinarily used to prepare THF/alkylene oxide polymerizates.

The alkylene oxide used can be any containing two or three carbon atoms in its oxide ring. It can be unsubstituted or substituted with, for example, alkyl or aryl groups, or with halogen atoms. Illustrative of such alkylene oxides are ethylene oxide; 1,2-propylene oxide; 1,3-propylene oxide; 1,2-butylene oxide; 1,3-butylene oxide; 3,3-bischloromethyl-1,3-propylene oxide, styrene oxide and epichlorohydrin.

The process of the invention is carried out by first preparing a 5–20%, by weight, slurry of the clay catalyst in THF. A mixture of THF and the alkylene oxide is then prepared, with the THF and oxide present in such proportions to one another as will give a copolymer with a THF/alkylene oxide weight ratio of 20–80/80–20, preferably 60–65/40–35. To this mixture is added 0.2–6%, by weight, of a chain terminator. Enough of the resulting reaction mass is then added to the clay slurry to give a clay concentration of about 3–25≅%, preferably 5–20%, by weight, in the mass. Illustrative of chain terminators which can be used are water, 1,4-butanediol, ethylene glycol, 1,6-hexanediol, trimethylolpropane, glycerine and pentaerythritol.

This reaction mass is then held at 40°–90° C., preferably 68°–80° C., with constant stirring, until a polymerizate having the desired molecular weight is obtained, as determined by periodic sampling and spectroscopic analysis. This ordinarily requires a reaction time of 30–240 minutes.

The clay is then separated from the reaction mass by filtration, decantation or centrifugation, and unreacted THF is separated from the mixture by distillation, leaving behind the THF/alkylene oxide polymerizate.

The process of the invention is preferably run in a continuous fashion. When run this way, the same relative amounts of catalyst and reactants, and the same temperatures and reaction times are used as in the batch mode. A slurry of clay is first prepared in a 50–60%, by weight, solution of batch-prepared polymerizate in THF. This slurry is stirred, heated to the reaction temperature and held there, with stirring, while a mixture of THF, alkylene oxide and chain terminator, in the desired proportions, is slowly added to it. After a suitable residence time, the product is withdrawn from the reaction zone, to give a THF/alkylene oxide polymerizate containing 4–8%, by weight, of oligomeric cyclic ethers.

The clay catalyst can be held in the reaction zone by suitable filters or screens. Some catalyst attrition may occur as the reaction proceeds and it may therefore be advisable to add 3–5%, by weight of the reaction mass, of fresh clay every 24 hours of reaction time.

As used herein, "oligomeric cyclic ether" means a compound having a calculated molecular weight of up to about 470 and containing one or more of the following units linked together:

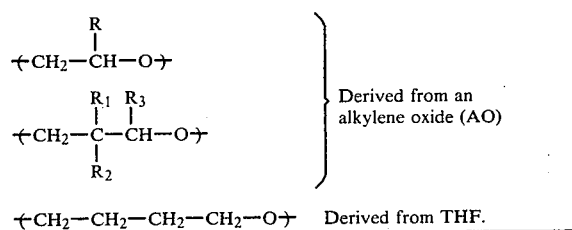

where R, R$_1$, R$_2$ and R$_3$ are hydrogen, methyl, ethyl or halomethyl.

Illustrative of such oligomeric cyclic ethers are those represented in the following table:

| Composition Number Ratio of AO Units to THF Units | |
|---|---|
| 2:1 | 1:4 |
| 1:2 | 3:3 |
| 3:1 | 5:2 |
| 2:2 | 2:4 |
| 4:1 | 4:3 |
| 1:3 | 6:2 |
| 3:2 | 3:4 |
| 5:1 | 5:3 |
| 2:3 | 2:5 |
| 4:2 | 4:4 |

Oligomeric cyclic ether (OCE) content is determined by programmed gas chromatography, using a stainless steel column having a length of 3.049 meters (10 feet) and an outside diameter of 3.175 mm (⅛ inch), packed with 5% by weight of "OV-101", a methyl silicone oil sold by Supelco, Inc., supported on 100-120 U.S.S. mesh "Chromsorb G", sold by Hewlett-Packard, Inc. The injection port of the column has a glass liner which must be replaced frequently to prevent contamination of the port with nonvolatile fractions of sample. The column is in an oven whose temperature is programmed to rise from 70°–300° C. at the rate of 30° per minute, with a 12 minute hold time at 300° C. before the cyclic is repeated. The instrument may be equipped with an integrator to determine the concentration of unknown in the sample. The determination is conducted under the following conditions:

| | |
|---|---|
| Injection port temperature | 280° C. |
| Thermal conductivity detector setting | 320° C. @150 milliamperes |
| Carrier gas @ gas flow | Helium @30 cubic centimeters per minute |
| Sample size | 10 microliters |
| Internal standard | Dimethyl ether of triethylene glycol |

The procedure is standardized by first preparing three standard solutions containing, respectively, 2%, 5% and 10% by weight of purified OCE in tetrahydrofuran. A sample of each standard solution is then prepared by measuring into a sample bottle 1.00 gram of the standard solution, 0.10 gram of the dimethyl ether of triethylene glycol and 10 ml of reagent grade toluene, and then shaking the bottle. Duplicates of each sample are injected in turn into the chromatograph, which is then run under the previously mentioned conditions.

The response factor (RF) of the determination is then calculated for each sample according to the equation $$RF = \frac{(\%OCE \text{ in standard}) (\text{area \% of internal standard}) \times (\text{weight of standard solution})}{(\text{area \% of OCE}) (\text{weight of internal standard}) (100)}$$

Average response factor, $RF_a$, is found by averaging the six response factors thus calculated.

The determination of OCE content is carried out by first preparing a sample of THF/alkylene oxide polymerizate of unknown OCE content by measuring into a sample bottle 1.00 gram of solvent-free polymerizate, 0.10 gram of internal standard and 10 ml of reagent grade toluene, and then shaking the bottle. The sample is then injected into the chromatograph which is then run under the previously mentioned conditions. OCE content is calculated from the results according to the equation.

$$\text{Weight percent of OCE} = \frac{\text{area \% of OCE}}{\text{area \% of internal standard}} \times 10 \, RF_a$$

Purified OCE for the standard solution is obtained by first distilling a raw THF/alkylene oxide polymerizate (the alkylene oxide being the same as that in the copolymer of the unknown) in a 5.08 cm (2-inch) Pope wiped film molecular still, sold by Pope Scientific, Inc., Menomonee Falls, Wisconsin. The distillation is carried out at 170°–190° C. and a pressure of less than about 26 Pa (0.2 mm of mercury), with an input rate of about 1 drop per second.

Two hundred parts by weight of the distillate are mixed with 60 parts by weight of 2,4-toluene diisocyanate and 3 drops of dibutyltin dilaurate and the mixture held at ambient temperature, with stirring, until the exothermic reaction subsides. The mixture is then held at 100° C. for two hours, with stirring, and its free isocyanate content determined by titration with di-n-butylamine, as described in Analytical Chemistry of the Polyurethanes, Volume XVI, Part III, D. J. David and R. B. Staley, Wiley-Interscience, 1969, pages 357–359. Enough ethylene glycol to give an isocyanate/hydroxyl mole ratio of about 1/1 is aded to the mixture, which is then brought to 100° C. and held there, for two hours, with stirring, to complete conversion to a polyurethane.

The resulting mixture containing the inert OCE is then extracted with diethyl ether and the extract concentrated on a rotary evaporater at 100° C. and a pressure of about 1333 Pa (10 mm of mercury). The concentrate is then distilled in the Pope molecular still at 170°–190° C. and a pressure of less than about 26 Pa (0.2 mm of mercury) and an input rate of about 1 drop per second. The distillate is purified OCE.

BEST MODE FOR CARRYING OUT THE INVENTION

In the following description, all parts are by weight.
(1) Into a reactor having a reflux condenser and an overflow tube were placed 150 parts of Catalyst KO.
(2) Seven hundred fifty parts of a 56% solution of batch-prepared THF/ethylene oxide polymerizate in THF were prepared. The polymerizate had a number average molecular weight of about 900.
(3) The solution of (2) was added to the reactor of (1), and the resulting slurry was heated to and held at 70° C., with stirring.
(4) A feed solution containing

| | |
|---|---|
| ethylene oxide | 1320 parts |
| water | 99 parts |
| THF | 5180 parts | was added to the slurry of (3), with stirring, at the rate of 9-10 parts per minute.

The polymerizate product was recovered from the reactor as overflow at the rate of 9-10 parts per minute. The THF/ethylene oxide copolymer in the polymerizate contained 38% of ethylene oxide units, and had a number average molecular weight of about 700. Conversion of monomers to polymer was about 56%. The polymerizate contained about 4% of oligomeric cyclic ethers.

INDUSTRIAL APPLICABILITY

The THF/alkylene oxide polymerizates produced by the process of the invention can be used to prepare polyurethanes according to methods well known in the art. The low oligomeric cyclic ether content of the polymerizates prepared by the preferred process especially suits them for use in preparing polyurethanes to be used in fabricating articles which, in use, are exposed to high temperatures, water or organic liquids.

I claim:

1. In a process for catalytically preparing a tetrahydrofuran/alkylene oxide polymerizate, the improvement comprising using as the catalyst an acid-activated montmorillonite clay having a pore volume of 0.4–0.8 cubic centimeter per gram, a surface area of 220–260 square meters per gram, and an average pore diameter of 0.1–0.3 micron.

2. The process of claim 1 wherein the alkylene oxide is ethylene oxide.

3. The process of claim 1 wherein the alkylene oxide is a propylene oxide.

* * * * *